Aug. 4, 1925.  
A. L. SOHM  
1,548,561  
INDICATOR  
Filed Dec. 26, 1922  5 Sheets-Sheet 1

Inventor  
A. L. Sohm,  
Attorney

Aug. 4, 1925.

A. L. SOHM

INDICATOR

Filed Dec. 26, 1922

Inventor
A. L. Sohm,
By
Attorney

Aug. 4, 1925.

A. L. SOHM 1,548,561

INDICATOR

Filed Dec. 26, 1922

Inventor
A. L. Sohm,

By

Attorney

Aug. 4, 1925.
A. L. SOHM
1,548,561
INDICATOR
Filed Dec. 26, 1922  5 Sheets-Sheet 5
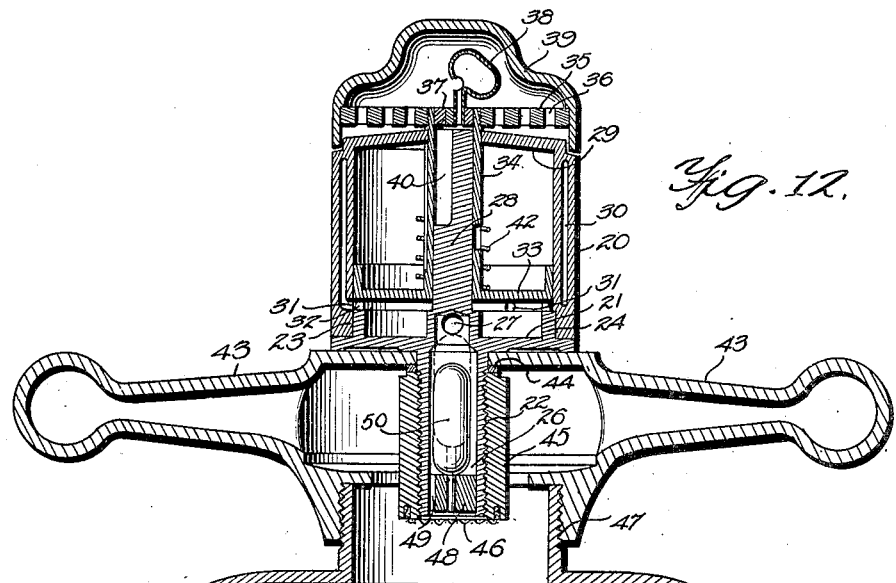
Fig. 12.
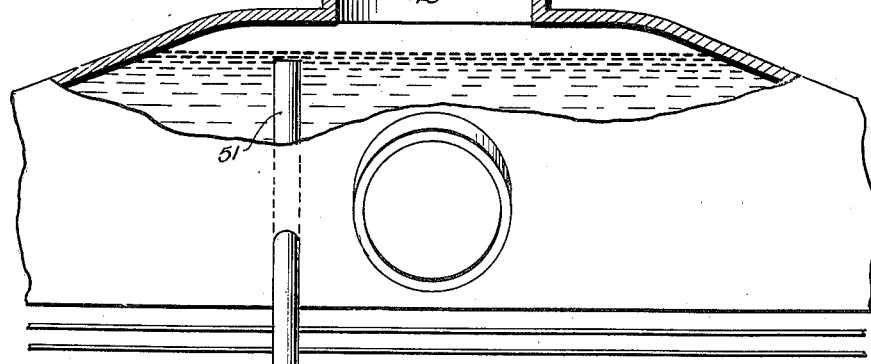
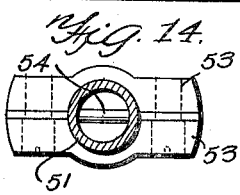
Fig. 14.
Fig. 15.
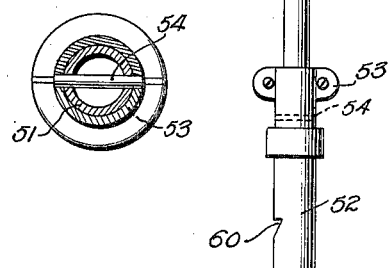
Fig. 13.
Inventor
A. L. Sohm,
By
Attorney Patented Aug. 4, 1925.

1,548,561

UNITED STATES PATENT OFFICE.

ALFRED L. SOHM, OF CHICAGO, ILLINOIS.

INDICATOR.

Application filed December 26, 1922. Serial No. 609,034.

*To all whom it may concern:*

Be it known that I, ALFRED L. SOHM, a citizen of the United States, residing at Chicago, in the county of Cook and State of Illinois, have invented certain new and useful Improvements in Indicators, of which the following is a specification.

This invention relates to pressure indicators and more particularly to a device for permitting escape of fluids and sounding a signal.

This application is, in part, a continuation of my copending application Serial No. 528,457, filed January 11, 1922, and allowed June 27, 1922.

In the present invention, I provide a cylinder connected to a container of fluid and communicating therewith, the cylinder being provided with a piston and being further provided with an opening normally closed by the piston and adapted to be opened by the movement of the piston to due pressure within the container to sound a signal, and additional means for permitting escape of fluid when a further increase in pressure occurs after the signal has been sounded.

An object of the invention is to provide means for operating an audible signal when the pressure in a receptacle or system approaches a dangerous point and then permit discharge of fluid upon further increase in pressure.

The device is also applicable to the cooling systems of motor vehicles as a temperature and pressure indicator and condenser. In one form of the invention, the usual overflow pipe is closed and the cylinder attached to the radiator cap opening. An increase of pressure in the cooling system by boiling of the cooling fluid raises the piston first to give an audible signal and then permit escape of steam.

In another form of the invention, the cylinder is secured to the radiator cap in the same manner and the safety blow-off valve is attached to the overflow pipe. The first increase in pressure is adapted to raise the piston to give an audible signal and the safety valve is set to operate at a slightly greater pressure to permit escape of fluid through the overflow pipe upon further increase.

In the accompanying drawings, I have shown several embodiments of the invention. In this showing:

Figure 1:
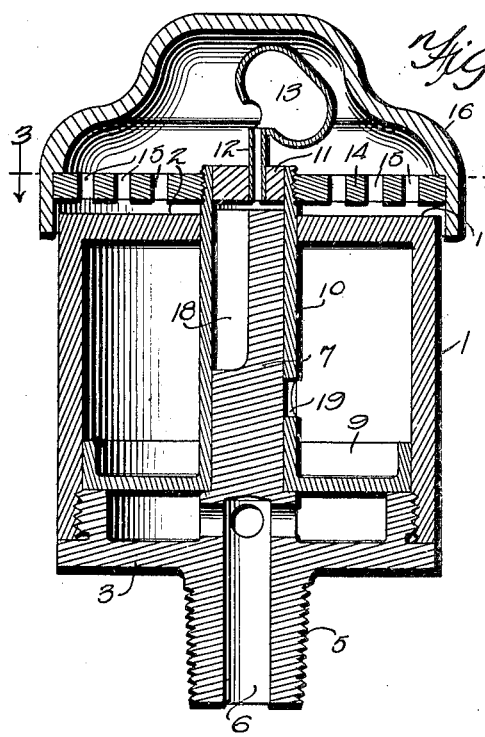
Figure 1 is a vertical sectional view showing the piston in lowered position.
Figure 2:
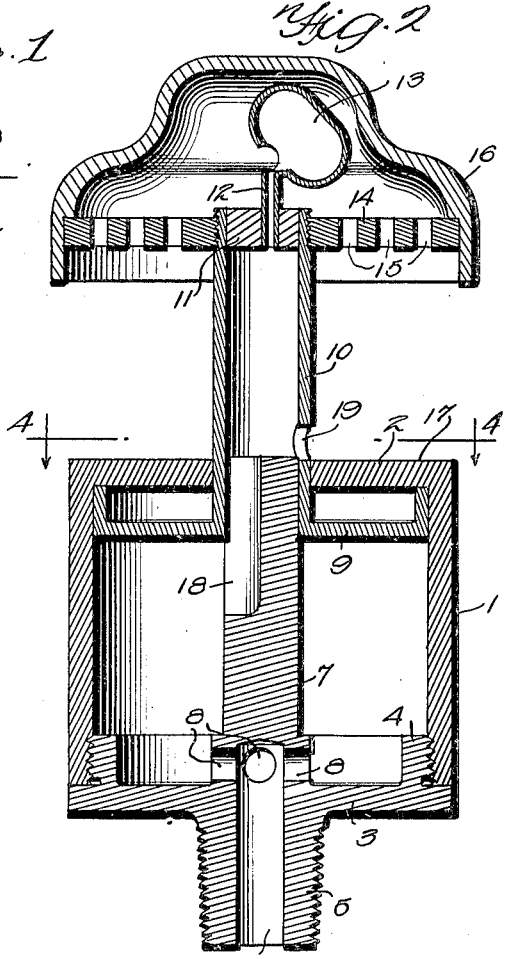
Figure 2 is a similar view showing the piston entirely raised.
Figure 3:
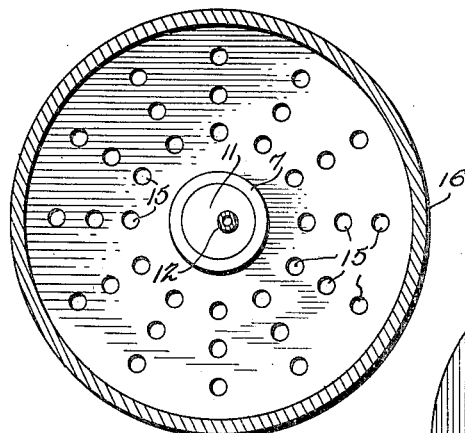
Figure 3 is a horizontal sectional view on line 3—3 of Figure 1.
Figure 4:
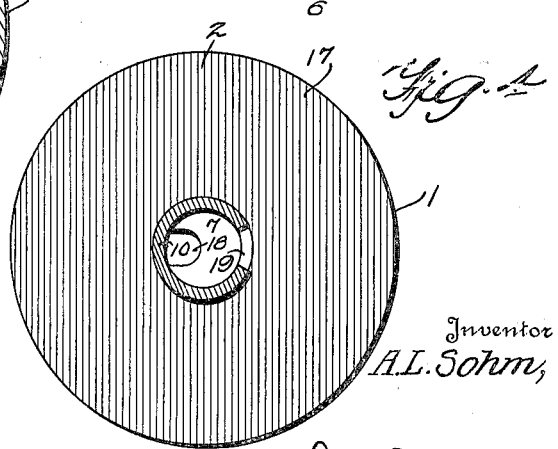
Figure 4 is a similar view on line 4—4 of Figure 2.
Figure 5:
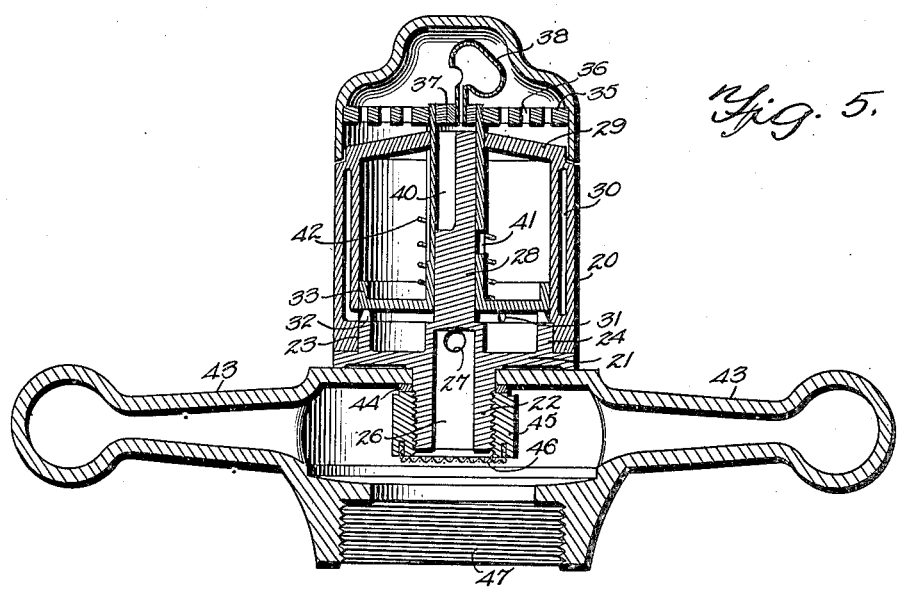
Figure 6:
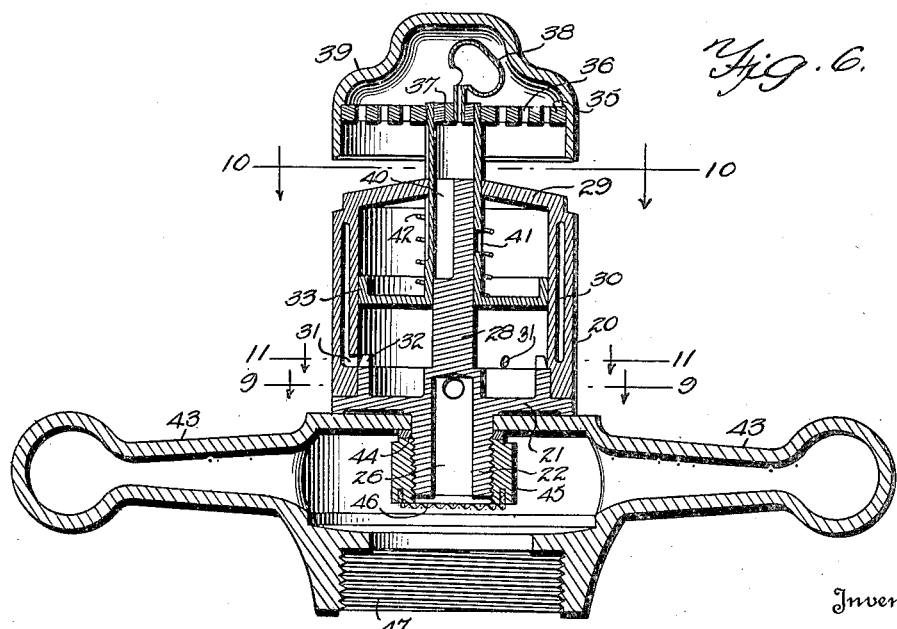
Figure 7:
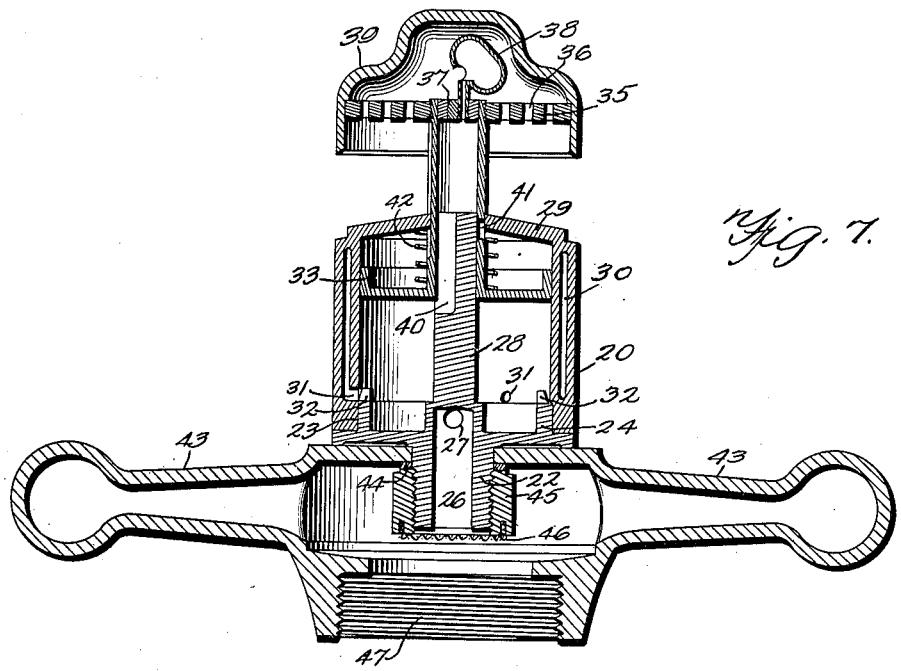
Figure 10:
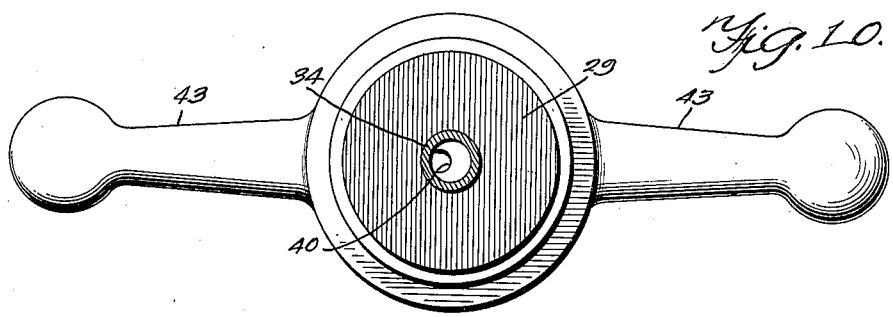
Figure 11:
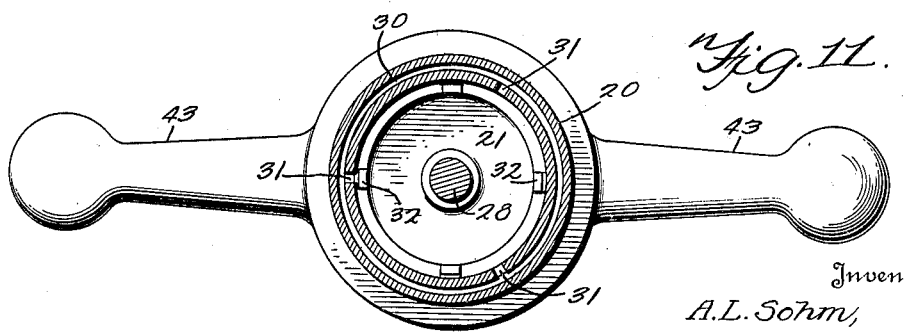
Figure 8:
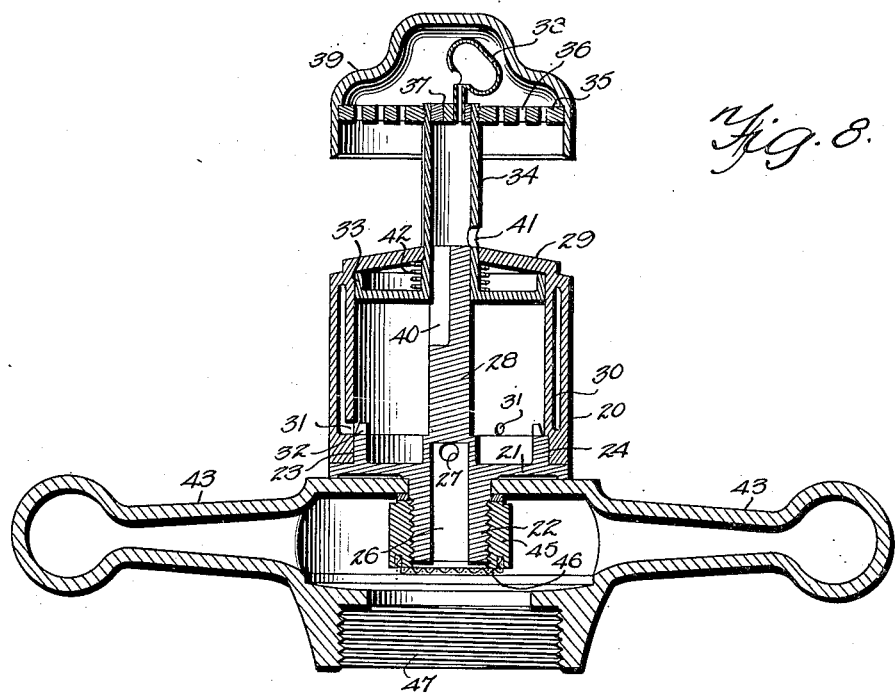
Figure 9:
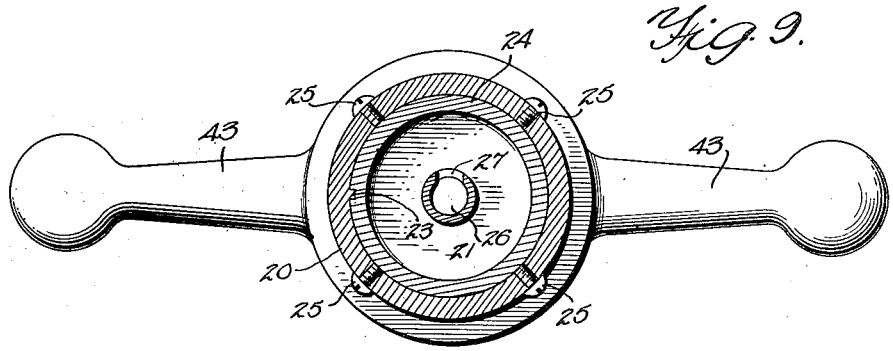

Figure 5 is a sectional view of another form of the apparatus adapted to be employed in connection with the cooling system of motor vehicles, Figure 6 is a similar view showing the piston in slightly raised position, Figure 7 is a similar view showing the piston raised sufficiently to operate the audible signal, Figure 8 is a similar view showing the piston in raised position permitting escape of steam, Figure 9 is a horizontal sectional view on line 9—9 of Figure 6, Figure 10 is a similar view on line 10—10 of Figure 6, Figure 11 is a similar view on line 11—11 of Figure 6, Figure 12 is a vertical sectional view of another form of the apparatus in position on an automobile radiator, Figure 13 is a detail sectional view of the lower end of the overflow pipe showing the blow-off or safety valve, Figure 14 is a horizontal sectional view on line 14—14 of Figure 13, and, Figure 15 is a similar view on line 15—15 of Figure 13.

Referring to Figures 1 to 4 of the drawings, the reference numeral 1 designates a cylinder provided with an upper head 2, secured thereto in any suitable manner, or formed integral therewith. The lower head 3 is provided with a threaded flange 4, the threads of which are adapted to engage threads formed on the end of the cylinder to secure the head in position. The lower head is provided with an extension 5 having a central passage or bore 6, which is adapted to be connected to the system or receptacle containing the fluid under pressure. The inner face of the head is provided with an extension 7 arranged substantially centrally thereof and extending through an opening in the upper head. The upper end of the bore 6 is connected to a plurality of transverse bores 8, communicating with the interior of the cylinder. A piston 9 is arranged within the cylinder, the piston being provided with a piston rod 10 in the form of a sleeve adapted to surround the extension 7. Exteriorly of the cylinder, the piston rod is provided with a closure member 11 having an opening therein for the reception of the stem 12 of a whistle 13. A plate 14 is secured to the piston rod, the plate being provided with a plurality of perforations. The perforated plate forms a support for a bell or cap 16, covering the whistle or other signal. The upper face 17 of the head 2 is colored red so that when the cap 16 is in the raised position, shown in Figure 2 of the drawings, a visible signal will be given as well as an audible signal. The extension 7 is provided with a cut-out portion 18 forming a passage communicating with the interior of the piston rod when the piston rod is in raised position. The piston rod is provided with an opening 19, communicating with the atmosphere when the piston is in the extreme raised position.

In the form of the invention shown in Figures 5 to 11 of the drawings, a cylinder 20 is provided, the cylinder having a lower flanged head 21, having a threaded extension 22 formed substantially centrally thereof. As shown, the lower portion of the interior of the cylinder wall is provided with spaced projections 23, adapted to be received in grooves formed in the flange 24 of the cylinder head. Suitable fastening means 25 may also be employed to retain the cylinder and cylinder head in adjusted position.

The extension 22 is provided with a central bore 26 extending into the interior of the cylinder and communicating therewith through openings 27. Beyond the openings 27, the extension forms a guide 28 which passes through an opening in the upper head 29 of the cylinder. As shown, the cylinder is provided with a double wall forming a space 30 communicating with the interior of the cylinder by means of openings 31. The flange 24 is likewise provided with openings 32 to permit steam to pass into the space 30.

A piston 33 is mounted in the cylinder, the piston being provided with a hollow stem 34 adapted to surround the guide 35 and extend through the upper cylinder head. The upper end of the piston rod is threaded and adapted to receive a plate 35 having a plurality of perforations 36 formed therein. This end of the piston rod is closed by a plug 37 adapted to support a whistle 38 of other audible signal arranged on said plug. A cap 39 is carried by the plate forming a cover and protector for the whistle.

The guide 28 is provided with a port or passage 40 extending from the top of the cylinder to a point intermediate the top and bottom. The piston rod is provided with an opening 41 arranged adjacent the bottom. A spring 42 may be arranged around the piston rod, as shown. The outer face of the upper cylinder head may be colored red or marked in some other suitable way to indicate danger.

The construction heretofore disclosed is substantially similar to the form of the invention disclosed in Figures 1 to 4. In assembling the device for use on a motor vehicle, a hollow cross arm 43 is connected to the lower end of the cylinder. The cross arm is provided with an opening for the reception of the extension 22. A gasket 44 is arranged within this opening and a nut 45 is secured on the extension holding the cross arm in position. A copper screen 46 may be arranged over the lower end of opening 26. The lower side of the cross arm is provided with a threaded opening 47 arranged in alinement with the extension 22, and adapted to be mounted on the opening in the top of the radiator of a motor vehicle (not shown).

In the form of the invention shown in Figures 1 to 4, the valve is adapted to be attached to various systems or receptacles holding any fluid which will vaporize when subjected to heat, to indicate the pressure and to prevent the creation of an excessive or dangerous pressure. The fluid enters through bore 6 and passes through transverse bores 8 into the cylinder beneath the piston 9. Increase in pressure raises the piston until the passage 18 is uncovered. The fluid then passes through the interior of the piston rod to the whistle 13, sounding the signal and then passing out through perforations 15. When the cap 16 is raised sufficient to sound the signal, the red top 17 of the cylinder will also be visible. If the pressure increases still further before an attendant takes the necessary steps to relieve it, the piston is raised to its extreme position and opening 19 is uncovered. This permits escape of fluid to the atmosphere and lowers the pressure. When the pressure decreases, the weight of the piston, the cap, and associated parts causes it to return to its normal position, covering the opening 18.

In the use of the form of the invention shown in Figures 5 to 11 of the drawings, when the engine of the motor vehicle is first started, and the cooling medium is cold, the piston will be in the position shown in Figure 5 of the drawings. Under ordinary running conditions, when the temperature of the cooling fluid has not reached a dangerous point, the pressure of the steam will be merely sufficient to maintain the parts in the position shown in Figure 6 of the drawings. During the normal operation, steam will flow into the space 30 and the cross arms 43 and be condensed. It is thus apparent that the device serves not only the function of a pressure and temperature indicator, but also serves as a condenser. As the piston raises, the cap is spaced from the upper cylinder head 29 and a visual signal will first be given, indicating that the cooling medium is becoming hot. Upon further upward movement of the piston, the port 40 will be uncovered and steam will pass to the whistle 38, giving an audible signal. At this point, the spring 42 begins to function, necessitating considerable increase in pressure to further raise the piston. If, however, the vehicle is further operated without replenishing the cooling fluid, the piston will be further raised by the additional increase in pressure to the position shown in Figure 8 of the drawings, bringing the port 40 into communication with the opening 41, and permitting the steam to escape. As stated, the usual overflow pipe of the radiator is closed in order that the steam formed will accumulate and give an increase in pressure.

In the form of the invention shown in Figures 12 to 15 of the drawings, the construction is substantially the same as that shown in Figures 5 to 11 of the drawings. The threaded extension 22 and the nut 45 are slightly elongated, as shown. A plug 48 is arranged in the bottom of bore 26 and this plug is provided with a plurality of openings 49 for the passage of fluid. This plug forms a stop for a float valve 50, arranged within and spaced from the walls of the bore and adapted to prevent passage of water from the radiator through the openings 27 when the valve is in the raised position shown in dotted lines. The opening 41 in the piston rod is eliminated in this form of the invention.

To permit escape of fluid when the pressure becomes excessive, a blow-off valve is provided which is arranged on the overflow pipe of the radiator. As shown, the radiator is provided with an overflow pipe 51. A valve member 52 is secured to the lower end of the overflow pipe by means of a two-part clamp 53. As shown, a pin 54 extends through the overflow pipe and clamp. The adjacent end of the valve member is provided with a valve seat 55, adapted to receive a ball valve 56 retained thereon by means of a spring 57. This spring rests upon a transverse member 58, as shown. The transverse member is provided with an opening 59, communicating with an outlet opening 60 forming a whistle.

In the operation of the form of the invention shown in Figures 12 to 15, the first raise in temperature and pressure in the cooling system causes the fluid to pass upwardly through the plug 48, bore 26, and openings 27, to the interior of the cylinder. This initially raises the piston to provide a visible signal and if the pressure continues to increase the piston will rise until the port 40 in the guide 28 is uncovered which permits the escape of steam or other fluid through the cap 39, blowing a whistle 38. Further upward movement of the piston, however, does not permit a sudden discharge of steam to the atmosphere, as the opening in the piston rod is eliminated. As the pressure of the steam increases, the valve 56 will be opened against the tension of spring 57, thus permitting escape of vapor and preventing the accumulation of dangerous pressures in the radiator. The strength of the spring 57 is predetermined to permit the valve 56 to open at a pressure in excess of that at which the whistle 38 is operated. The steam then escapes through the overflow pipe, blowing the whistle 60. As soon as the pressure in the system decreases due to the escape of steam through the overflow pipe, the valve 50 assumes its normal position.

It has been found that if the radiator is filled to overflowing when the engine and cooling system are cold, the heat generated by the engine after it has been started will expand the water in the cooling system causing some of it to flow upwardly through the openings 49 and into the bore 26. I provide means for preventing this excess water from flowing upwardly into the cylinder whereby it will be blown outwardly through the whistle. As previously described I provide the float valve 50 mounted within the bore 26 and this float is adapted to move upwardly and close communication between the bore 26 and the interior of the cylinder when the water level rises within the bore 26. As soon as communication is closed between the bore 26 and the interior of the cylinder continued expansion of the water will build up a pressure within the interior of the radiator which will open the check valve 56 at the lower end of the overflow pipe and permit the excess water to escape. Ordinarily it is desirable to leave considerable space between the water level and the upper end of the radiator filling spout when the radiator is filled with water. Under any circumstances however the valve 50 permits water from being thrown outwardly from the whistle and spattering over the automobile.

It is to be understood that the forms of the invention herewith shown and described are to be taken as preferred examples of the same, and that various changes in the shape, size, and arrangement of parts may be resorted to without departing from the spirit of the invention or the scope of the subjoined claims.

Having thus described my invention, I claim:

1. A pressure control device comprising a cylinder, a piston mounted therein, a visible signal arranged on said cylinder and adapted to be uncovered by the movement of the piston, an audible signal arranged adjacent said cylinder, and means for actuating said audible signal upon further movement of the piston.

2. The combination with a radiator of a motor vehicle, said radiator being provided with an opening, of a member secured in said opening, a cylinder carried by said member, said cylinder being provided with an opening to permit passage of fluid from the interior of the radiator to the interior of the cylinder, a signal arranged adjacent said cylinder, a piston mounted in said cylinder, means for actuating the signal when the piston is raised due to pressure within said cylinder, and means to permit escape of fluid upon further increase in pressure.

3. The combination with the radiator of a motor vehicle, said radiator being provided with an opening, of a member secured in said opening, said member being provided with arms furnishing a surface for condensation of fluid within said member, a cylinder carried by said member, said cylinder being provided with an opening to permit passage of fluid into the interor of the cylinder, a piston mounted in said cylinder, a signal arranged adjacent said cylinder, means for actuating said signal when the piston is raised due to pressure in said cylinder, and means to permit escape of fluid upon further increase in pressure.

4. The combination with the radiator of a motor vehicle, of a pressure control apparatus comprising a cylinder having an opening for the introduction of fluid, a piston arranged therein, adapted to be actuated by the pressure of the fluid, a signal arranged adjacent said cylinder, means for actuating said signal when the piston moves a predetermined distance, and means for discharging fluid upon further increase in pressure.

5. The combination with the radiator of a motor vehicle, of a pressure control apparatus comprising a cylinder having an opening for the introduction of fluid, a piston arranged therein, a piston rod connected thereto and extending through one end of the cylinder, said piston rod being hollow, a fluid operated signal carried by said piston rod, means for admitting fluid into said piston rod to actuate the signal when the piston travels a predetermined distance, and means for discharging fluid upon further increase in pressure.

6. The combination with a radiator of a motor vehicle, of a pressure control apparatus comprising a cylinder having an opening for the introduction of fluid, a central guide member arranged within the cylinder, a piston adapted to reciprocate in said cylinder, a hollow piston rod connected to said piston and surrounding said guide, said guide being provided with a passage to permit the fluid to enter the piston when the piston is raised to a position above said passage by the pressure of the fluid, an audible signal arranged on said piston rod and adapted to be actuated by the fluid passing through the piston rod, and means to permit escape of fluid upon further increase in pressure.

7. A pressure control device comprising a substantially vertical cylinder having an opening in its lower end for the introduction of fluid, a central guide member arranged within the cylinder, a reciprocating piston mounted within the cylinder and normally arranged near the lower end thereof, a condensing chamber surrounding said cylinder and communicating therewith beneath said piston, a hollow piston rod connected to said piston and surrounding said guide, said guide being provided with a passage arranged at a point remote from the inlet end of the cylinder to permit fluid to enter the piston rod when the piston moves to a position beyond said passage, and a signal carried by said piston rod and adapted to be actuated by the fluid passing through said rod.

8. A pressure control device comprising a cylinder, having an opening for the introduction of fluid, a central guide member arranged within the cylinder, a reciprocating piston arranged in said cylinder, a hollow piston rod connected to said piston and surrounding said guide, said guide being provided with a passage arranged at a point remote from the inlet end of the cylinder to permit fluid to enter the piston rod when the piston moves to a position beyond said passage, a signal carried by said piston rod and adapted to be actuated by the fluid passing through said rod, and means for retarding the movement of said piston.

9. A pressure control device comprising a cylinder in communication with a source of pressure, a cylinder head closing the upper end of said cylinder and being colored to provide a visible signal, said head being provided with a central opening, a central guide member arranged within the cylinder, a reciprocating piston arranged in said cylinder, a hollow piston rod connected to said piston and surrounding said guide, said piston rod projecting through the opening in said cylinder head, a fluid operated signal carried by the projecting end of said piston rod and communicating with the interior thereof, and a cap carried by the projecting end of the piston rod and normally adapted to cover said cylinder head, said guide being provided with a passage having its inlet end arranged at a point remote from the inlet end of said cylinder to permit fluid to enter the piston rod when the piston moves to a position beyond the inlet end of said passage.

10. The combination with the cooling system of a motor vehicle, said cooling system including a radiator having an inlet opening and an overflow pipe, of a pressure indicating device comprising a cylinder adapted to be arranged in the inlet opening and communicate with the interior of the radiator, a piston arranged in said cylinder and adapted to be raised by pressure, a signal arranged adjacent said cylinder, means for actuating said signal when the piston is raised a predetermined distance, and a valve arranged in said overflow pipe, said valve being normally closed but being adapted to open upon further increase in pressure to permit escape of fluid.

11. A pressure control device comprising a chamber having an opening for the introduction of fluid, and a member adapted to be moved by a predetermined increase in pressure in said chamber, said member having a portion arranged without said chamber to provide a visible signal, and being operable by a further increase in pressure for opening said chamber to communication with the atmosphere.

12. The combination with the cooling system of a motor vehicle, said system including a radiator, of a pressure indicating device comprising a chamber having an inlet opening communicating with the radiator, a member arranged adjacent and adapted to close said inlet opening when the water in said system rises above a predetermined level, a pressure responsive member mounted within said chamber and movable by pressure therein, a portion of said last named member being arranged without said chamber to provide a visible signal, and means connected with the radiator to open it to the atmosphere when the inlet opening of said chamber is closed and pressure is present in the radiator.

13. The combination with the cooling system of a motor vehicle including a radiator, of a pressure indicating device comprising a chamber having an inlet opening communicating with the radiator, a member arranged adjacent said chamber and adapted to be operated by an increase in pressure therein, and means operable by a further increase in pressure for permitting escape of fluid from the radiator.

14. The combination with the cooling system of a motor vehicle, said system including a radiator, of a pressure indicating device comprising a chamber having an inlet opening communicating with the radiator, a visible signal operable by an increase in pressure within said chamber, an audible signal operable by a further increase in pressure within said chamber, and means operable by a still further increase in pressure for opening the radiator to the atmosphere.

15. A pressure control device comprising a cylinder having an opening for the introduction of fluid, a piston mounted therein, and a movable member arranged without said cylinder and connected with said piston, being adapted to move said member upon an increase in pressure within said cylinder, and being operable upon a further increase in pressure in said cylinder to permit escape of fluid therefrom.

16. The combination with the radiator of a motor vehicle, of a signal operable upon an increase in pressure in the radiator, and means operable upon a further increase in pressure for discharging fluid from the radiator at a point remote from said signal.

17. The combination with the radiator of a motor vehicle, of a valve connected with the lower portion of the radiator and adapted to open upon a predetermined increase the pressure within the radiator, a pressure chamber communicating with the upper portion of the radiator, and a signal operable upon an increase in pressure within said chamber but below the pressure at which said valve is adapted to open.

18. The combination with the cooling system of a motor vehicle including a radiator having an overflow pipe, the outlet end of said pipe being arranged adjacent the lower end of said radiator, of a pressure chamber communicating with the upper end of the radiator, a signal operable upon an increase in pressure within said chamber, and a valve carried by the discharge end of the overflow pipe and adapted to open said pipe to the atmosphere upon a further increase in pressure.

19. The combination with the radiator of a motor vehicle having the usual overflow pipe, of a pressure chamber communicating with the radiator above the level of the water therein, said chamber being provided with an opening adapted to afford communication between the interior of said chamber and the atmosphere, a movable member arranged in said chamber and normally closing communication through said opening, said member being movable by a predetermined increase in pressure in said chamber to open said opening, a visible signal connected to said movable member, a condensing chamber communicating with said pressure chamber, and a check valve arranged in said overflow pipe.

In testimony whereof I affix my signature in presence of two witnesses.

ALFRED L. SOHM.

Witnesses:
C. R. BARBER,
E. JACOBS.